United States Patent [19]

Devanathan et al.

[11] Patent Number: 5,723,041
[45] Date of Patent: Mar. 3, 1998

[54] PROCESS AND APPARATUS FOR PROMOTING ANNULARLY UNIFORM FLOW

[75] Inventors: Narasimhan Devanathan, Aurora; Peter J. Klomans, Lockport, both of Ill.; William B. VanderHeyden, Los Alamos, N. Mex.

[73] Assignee: Amoco Corporation, Chicago, Ill.

[21] Appl. No.: 541,334

[22] Filed: Oct. 10, 1995

Related U.S. Application Data

[63] Continuation-in-part of Ser. No. 321,211, Oct. 10, 1994, Pat. No. 5,569,434.

[51] Int. Cl.$^6$ .................................................. C10G 45/00
[52] U.S. Cl. ........................ 208/158; 208/157; 208/146; 585/922; 585/923; 585/955; 422/220; 422/224; 422/228
[58] Field of Search ........................ 208/146, 157, 208/158; 585/922, 923, 955; 422/220, 224, 228

[56] References Cited

U.S. PATENT DOCUMENTS

| | | | |
|---|---|---|---|
| 2,897,063 | 7/1959 | Breier | 585/923 |
| 3,414,386 | 12/1968 | Mattix | 23/288 |
| 3,630,687 | 12/1971 | Van Driesen et al. | 23/285 |
| 3,698,876 | 10/1972 | Gregoli et al. | 23/288 E |
| 4,444,653 | 4/1984 | Euzen et al. | 208/152 |
| 4,571,326 | 2/1986 | Bischoff et al. | 422/220 |
| 4,639,354 | 1/1987 | Bischoff et al. | 422/220 |
| 4,702,891 | 10/1987 | Li et al. | 422/140 |
| 4,707,340 | 11/1987 | Milligan | 422/140 |
| 4,753,721 | 6/1988 | McDaniel et al. | 208/143 |
| 4,804,458 | 2/1989 | Buttke et al. | 208/146 |
| 4,933,149 | 6/1990 | Rhee et al. | 422/220 |
| 4,969,988 | 11/1990 | Jain et al. | 208/108 |
| 4,985,209 | 1/1991 | Renard et al. | 422/220 |
| 4,990,241 | 2/1991 | Buttke et al. | 208/146 |

OTHER PUBLICATIONS

U.S. patent application serial No. 08/323,389 filed Oct. 14, 1994 by N. Devanathan et al. entitled "Hydrocarbon Processing Apparatus and Method".

Primary Examiner—Walter D. Griffin
Attorney, Agent, or Firm—Robert A. Yesukevich; Frank J. Sroka; Richard A. Kretchmer

[57] ABSTRACT

An apparatus is described for promoting annularly uniform flow in a reaction space of a mixed phase reactor. The apparatus defines ports which face a shared direction relative to the axis. The apparatus is useful in a process, also described, in which fluid emerging from the ports creates a turning moment which rotates fluid in a plenum adjacent the reaction space.

14 Claims, 6 Drawing Sheets

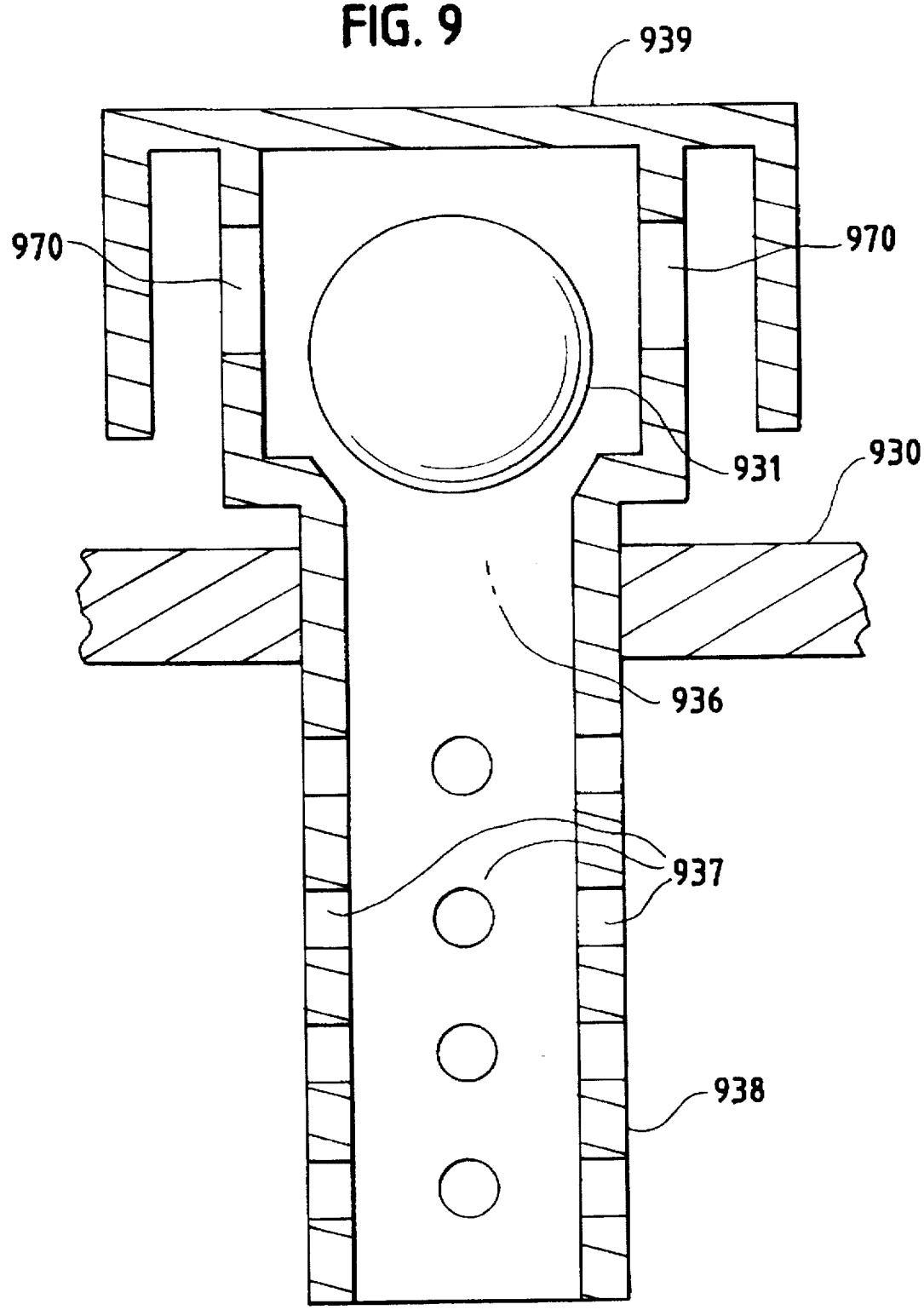

PROCESS AND APPARATUS FOR PROMOTING ANNULARLY UNIFORM FLOW

This application is a continuation-in-part of U.S. patent application Ser. No. 08/321,211, filed Oct. 10, 1994, now U.S. Pat. No. 5,569,434.

FIELD OF THE INVENTION

This invention relates generally to mixed phase chemical processing and, more particularly, to a feed distributor and process for promoting annularly uniform flow in ebullating bed or slurry-type reactors.

BACKGROUND OF THE INVENTION

Modern reactors for converting heavy hydrocarbonaceous feedstocks such as petroleum residuum ("resid") to lighter, more valuable products often employ slurry-type or ebullated bed hydroconversion processes. In both slurry-type and ebullated bed reactors, feedstock typically enters to reactor vessel alone or together with hydrogen through an inlet pipe or sparger. The pipe or sparger typically is located in a lower portion of the reactor vessel in a liquid mixing region termed a plenum.

In ebullated bed reactors, a mixture of process liquids and hydrogen is forced upwardly from the liquid mixing region through a distributor grid or plate containing a plurality of bubble-capped risers. Feedstock, hydrogen, and recycled liquid travel through the risers to expand a bed of supported catalyst located above the grid. Maintaining the catalyst bed in a properly expanded condition requires that the liquids supporting the bed exhibit a generally annularly symmetric liquid and gas velocity distribution in the expanded bed region of the reactor. Ebullating bed reactors are described, for example, in U.S. Pat. No. 3,414,386 issued to Mattix; U.S. Pat. No. 3,630,687 issued to Van Driesen; and U.S. Pat. No. 3,698,876 issued to Gregoli et al. which are hereby incorporated by reference in their entirety, and especially for their teachings relating to reactor internals and flow distribution.

In slurry-type reactors, a distributor grid and bubble-capped risers are not needed to prevent supported catalyst from falling into the liquid mixing region. Nevertheless, many slurry-type reactors resemble ebullated bed reactors in that fresh feedstock, recycled liquids and liquid or colloidal catalyst are blended together in a liquid mixing region in the lower end of a reactor. The mixture is then forced upwardly through a distributor grid or other device intended to provide a desired liquid velocity distribution in the region of the reactor located above the liquid mixing zone. A slurry-type reactor is described by U.S. Pat. No. 4,969,988 issued to Jain et al., which is hereby incorporated in its entirety.

Fluids moving upwardly in vertically oriented, generally cylindrically-shaped slurry-type or ebullated bed reactors preferably have a velocity that is equal or nearly equal at all points located the same radial distance from the axis at a given elevation. If asymmetries in the reactor annular velocity profile occur, mixing will not be uniform within the reactor. In ebullated bed reactors, insufficient liquid velocity may prevent the catalyst bed from expanding to the desired height or cause catalyst to accumulate or "slump" in areas of low liquid velocity. Catalyst slumping can in turn result in the formation of reactor hot spots and coke accumulation.

Various structures have been employed to minimize deviations in the liquid velocity profile of slurry-type or ebullated bed reactors. For example, U.S. Pat. No. 4,444,653 to Euzen, which is hereby incorporated, discloses a plurality of inlet spargers which disperse a reactor feedstock through a plurality of relatively small discharge orifices located along the spargers. While these sparger designs may be beneficial in some applications, the use of spargers with large numbers of relatively small holes such as those disclosed by Euzen can be problematic when the reactor charge is a heavy hydrocarbonaceous feedstock such as a petroleum resid, because relatively small holes can easily become plugged in a resid hydrotreating environment. Euzen's designs also are subject to the momentum-related problems discussed in depth below.

U.S. Pat. No. 4,707,340 issued to Milligan, which is hereby incorporated in its entirety, describes an ebullating bed reactor in which a feedstream enters a plenum via a conduit, is deflected upwardly through a stationary baffle, and then flows sequentially through two distinct grid plates equipped with riser tubes. The '340 patent states that the grid plates provide for lateral distribution of the fluid flow. Reportedly, the gas/liquid mixture is redistributed horizontally and the gas portion rises to form gas spaces beneath the grids. However, the assembly of two grid plates is cumbersome and plugging of some of the riser tubes by coke formation, for example, can result in non-uniform ebullation.

Another method for improving the flow distribution of liquids in an ebullated bed reactor is disclosed in U.S. Pat. No. 4,702,891 to Li, which is hereby incorporated in its entirety. This method employs a radially-symmetric recycle liquid inlet nozzle located along the centerline of a generally cylindrical reactor vessel and in a liquid mixing region below the reactor's distributor plate. Feedstock and hydrogen are introduced into the same region through a ring sparger located above the recycle nozzle. As is common in many such reactors, feedstock appears to be required to enter the reactor in an asymmetric manner because of mechanical constraints inherent in the reactor design. While Li's design may be useful in some instances, our experimental work shows that the use of a ring sparger such as in the Li patent introduces sufficient unwanted horizontal momentum into fluids present below the distributor plate to cause serious deviations in the liquid velocity profile above the distributor plate. Specifically, although Li's horizontal sparger includes downwardly-directed discharge apertures, horizontal motion through the sparger causes the discharged feedstock to retain an undesired horizontal momentum component. This undesired horizontal momentum component due to pressure differences along the sparger can seriously degrade the liquid local velocity profile in the reactor region located above the sparger.

U.S. Pat. No. 4,753,721 issued to McDaniel et al., which is herein incorporated by reference for its teachings relating to ebullated bed reactors, describes passing gas and oil feeds from a common feed line to a feed distributor comprising an annular manifold in the bottom portion of an ebullated bed reactor. The gas and oil feeds are reportedly discharged in a generally uniform flow pattern, some of the oil and gas feeds being discharged substantially downwardly from the single feed distributor. The '721 patent additionally states that some of the oil and gas feeds can be tangentially discharged from outlet pipe sections of the manifold, and some of the oil and gas feeds can be radially discharged.

What is needed is a means for introducing feedstock into a reactor that minimizes asymmetry in the liquid velocity profile in a reaction zone of the reactor. Preferably, the new method and apparatus provides annularly uniform flow and resistance to fouling and catalyst plugging without unduly increasing complexity and cost. More preferably, the new method provides annularly uniform flow over a broad range of charge rates and operating conditions.

SUMMARY OF THE INVENTION

The invention is an apparatus and a process for promoting annularly uniform flow in a reaction space of a mixed phase reactor by rotating a polyphasic fluid about an axis in a plenum chamber of the reactor and passing the fluid axially through a foraminous grid to a reaction space. The apparatus defines ports which face a shared direction relative to the axis. In the process, fluid emerging from the ports creates a turning moment which rotates the fluid in the plenum. Rotating the fluid minimizes the effect on the reaction space of flow imbalances in the plenum caused by, for example, upwelling of a lighter phase in one portion of the plenum.

In one aspect, the invention is an apparatus for promoting annularly symmetric flow of a feed fluid. The apparatus comprises an axially oriented reactor vessel having an internal volume defined by a sidewall, an inlet end and an outlet end. The internal volume is divided into a plenum and a reaction space by a foraminous grid extending transversely from the sidewall. The grid defines a plurality of passages which communicate with the plenum and the reaction space. A feed distributor suitable for delivering the feed fluid defines ports within the plenum. The ports are located a radial distance from the axis, oriented to deliver the feed fluid in a common plane which is transverse to the axis, and faced toward a shared rotary direction relative to the axis.

In another aspect, the invention is an apparatus which comprises an axially oriented vessel, a foraminous grid, and a feed distributor, as described above. Additionally, the apparatus includes a recycle conduit communicating with the plenum and with a distal portion of the reaction space, and includes a recycle pump adapted for urging material in the reaction space to enter the recycle conduit as a recycle fluid.

In still another aspect, the invention is a process for conducting a chemical reaction, which comprises passing a feed fluid including a relatively buoyant phase and a denser phase into a generally cylindrical plenum. In the plenum, the fluid is rotated about the axis to promote an axially symmetric flow of the fluid. The fluid is passed into a reaction space through passages defined by a grid extending transversely from a side wall of a vertically oriented reactor vessel. The feed fluid is exposed to a conversion catalyst, preferably in an ebullating bed, and a product is withdrawn from the reaction space.

In yet another aspect, the invention is a hydrotreating process, which comprises passing a feed fluid including a hydrocarbon liquid and a hydrogen-rich gas into a plenum defined by a vertically oriented reactor vessel. The feed fluid is blended with a recycle fluid to produce a combined fluid, and rotated about the plenum. Passages defined by a grid extending transversely from a sidewall of the reactor vessel conduct the combined fluid axially from the plenum to a reaction space within the reactor vessel. The combined fluid enters the reaction space in a substantially axially symmetric flow and is exposed to a conversion catalyst. Hydrotreated product is withdrawn from the reaction space, and a portion of the hydrotreated product is conveyed to the plenum as a recycle fluid.

BRIEF DESCRIPTION OF THE DRAWINGS

FIG. 9 is a cross sectional view of a bubble cap riser having inlet apertures, outlet openings and a ball.

DETAILED DESCRIPTION OF PREFERRED ASPECTS

Our research has demonstrated that multi-phase upflow reactors generally develop a recirculating pattern of flow which is quite sensitive to the manner in which fluids are introduced into the reaction space. The most desirable recirculation patterns are those which have identical axial velocities at points of equal radial distance from the axes. These desirable reaction space flow patterns are termed annularly uniform flow patterns.

For example, annularly uniform flow patterns tend to maintain ebullated beds of particulate solids in suspension and circulation. Annular flow patterns provide more efficient usage of reactor volume for mass-transfer limited reactions, by distributing reactants more widely throughout the reactor volume. In the case of fermentation reactions, annular flow patterns are effective in carrying oxygen to substrates, such as bacteria or yeast.

The instant invention provides improved annular flow distribution for mixed phase chemical processing reactors. It is contemplated that the invention be employed, for example, with ebullated bed reactors, slurry-type reactors, fermentation reactors. However, for the sake of clarity, preferred aspects of the invention will now be described as they relate to ebullated bed reactors for hydrotreating resid.

Figure 1:
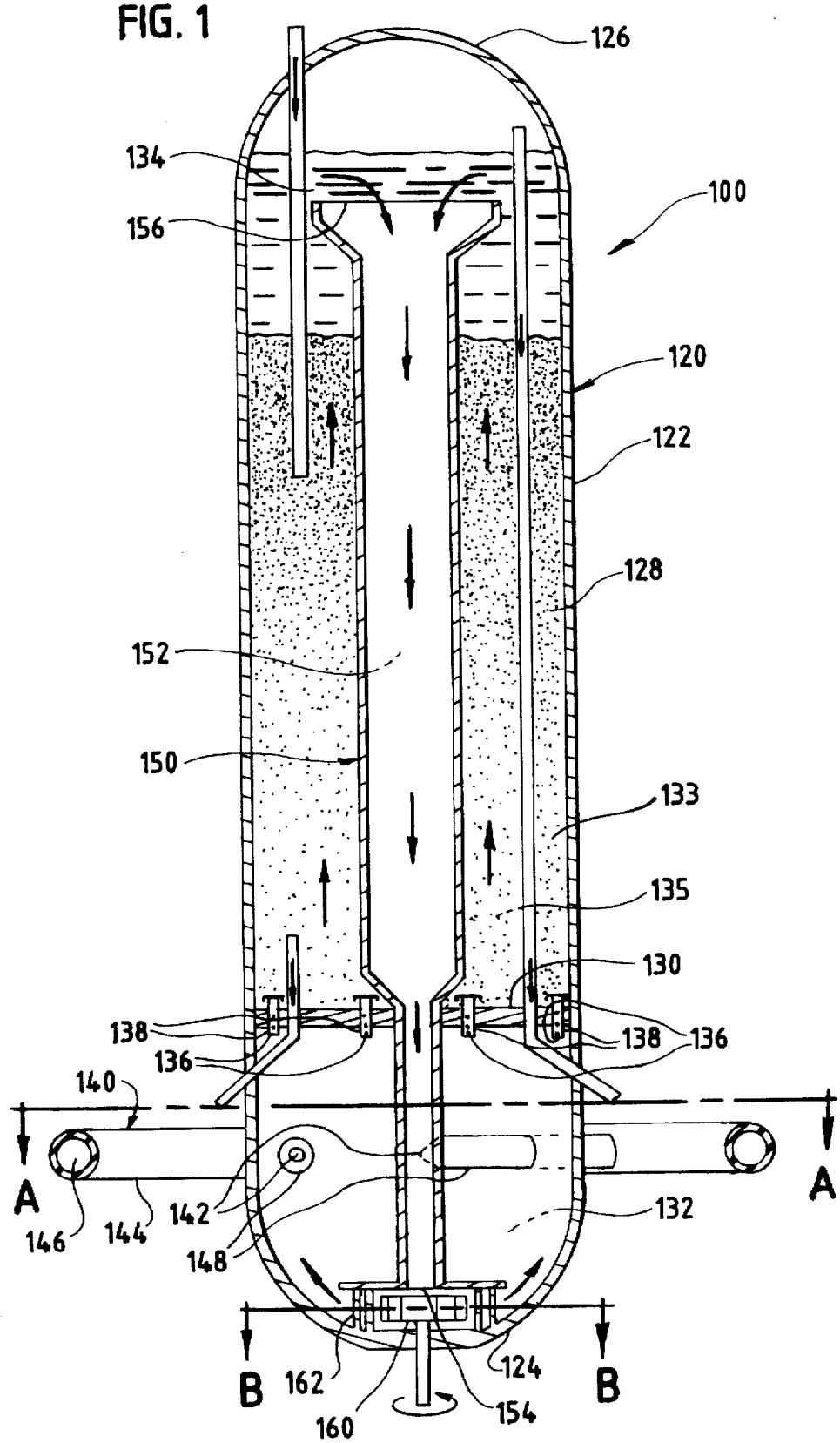
FIG. 1 is a cross sectional elevation view of a resid hydrotreating reactor in accordance with the present invention including a feed distributor and a foraminous grid.

In one preferred aspect, the invention is an apparatus for promoting axially symmetric flow of a polyphasic feed fluid, such as apparatus 100 shown in FIG. 1. The apparatus 100 includes a reactor vessel 120 having a sidewall 122, an inlet end 124 and an outlet end 126 which collectively define an internal volume 128. The axis of the reactor vessel 120 is generally vertical and parallel with the sidewall 122. During operation, the inlet end 124 is lower than the outlet end 126. The reactor vessel 120 is preferably cylindrical so that a single sidewall, such as the sidewall 122, is sufficient to circumscribe the internal volume 128. However, it is contemplated that the invention be practiced in reactor vessels having, for example, rectangular or polygonal cross sections constituted by a plurality of sidewalls.

Ebullating bed reactor vessels, such as the reactor vessel 120, are typically penetrated by a catalyst inlet for adding a catalyst, a vapor outlet, a fluid product outlet, and a feed distributor, such as the feed distributor 140 which is described below. Internal to the reactor vessel 120 is a recycle conduit 150 located along the axis of the reactor vessel 120. Recycle conduit 150 extends downwardly from a frustoconical recirculation pan formed by a distal end 156 of the recycle conduit 150. The distal end 156 is typically located below a liquid level during operation with a vapor space located above the liquid level adjacent outlet end 126.

Figure 8:
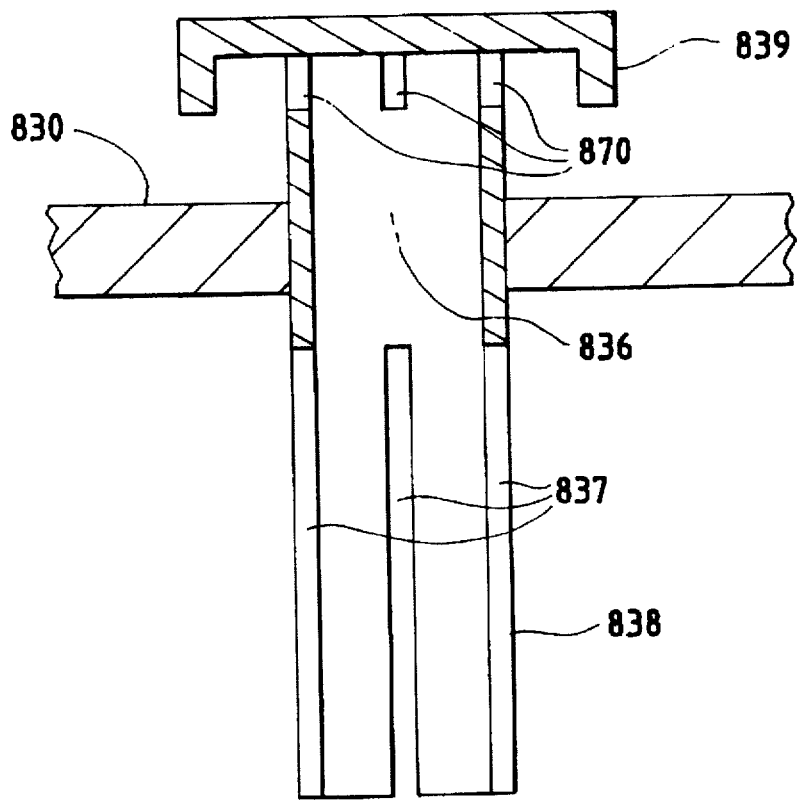
FIG. 8 is a cross sectional view of a riser having inlet apertures, outlet openings and a cap.

The recycle conduit 150 extends through a foraminous grid 130 and defines a proximate end 154 which communicates hydraulically with a recycle pump 160 mounted on the inlet end 124 of the reactor vessel 120. The grid 130 defines a plurality of passages 136. Preferably, each of the passages 136 is equipped with a dedicated tubular riser 138. An exemplary riser 838, depicted in FIG. 8, surrounds a passage 836 and includes a plurality of slotted inlet apertures 837, a plurality of outlet openings 870, and a cap 839. Grid 830 is analogous to the grid 130 depicted in FIG. 1.

Turning now to FIG. 9, another exemplary riser 938 surrounds a passage 936 and includes circular inlet apertures 937, outlet apertures 970, and a cap 939. The riser 938 additionally includes a ball 931. Grid 930 is analogous to the grid 130 depicted in FIG. 1. It should be noted that the use of bubble-capped risers, such as the risers 838 and 938, is highly preferred, but that in some reactors a suitable grid may simply comprise a plate having a plurality of slots or other apertures.

Returning to FIG. 1, the grid 130 extends transversely from the sidewall 122 and serves to divide the internal volume 128 into an upper reaction space 133 and a lower plenum 132. Finely divided particulate catalyst is present in the reaction space 133, preferably as an ebullated bed. During operation, the bed is expanded but limited in height, by application of well-known hydrodynamic principles, so that the ebullated bed is concentrated in a proximate portion 135 of the reaction space 133, the proximate portion 135 being located adjacent the grid 130. A distal portion 134 located at or above the elevation of the distal end 156 of the recycle conduit 150, but below the liquid level, is relatively catalyst free inasmuch the liquid superficial velocity of fluids in the distal portion 134 is insufficient to support the ebullating bed.

The grid 130, the sidewall 122 and the inlet end 124 define a plenum 132. The feed distributor 140 defines within the plenum four ports, each of the ports located a radial distance from the axis, oriented to deliver the feed fluid in a common plane which is transverse to the axis, and facing a shared rotary direction relative to the axis.

Figure 2A:
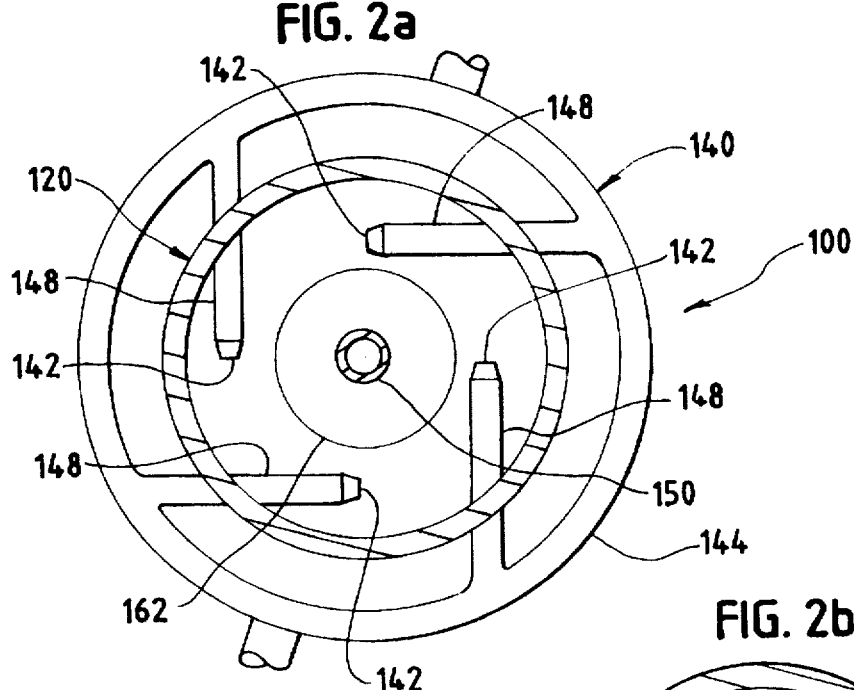
FIG. 2a is a cross sectional plan view of the resid hydrotreating reactor shown in FIG. 1 taken along line A—A of FIG. 1 depicting an external header and a feed distributor defining four ports.

The feed distributor 140 includes an external feed header 144 which can be seen in FIG. 2a. The feed header 144 is external in the sense that it is located predominantly outside of the reactor vessel 120. The header 144 defines a flow chamber 146 through which the polyphasic feed fluid is conducted. The header 144 facilitates delivery of the feed fluid to a plurality of feed conduits 148, each of the conduits 148 being dedicated to carrying feed fluid to one of the ports 142. Preferably, the ports 142 are spaced about the axis and each of the feed conduits 148 are of hydraulically equivalent length so that, during operation, fluid jets of similar momentum are established adjacent each of the ports 148. The concept of equivalent length described at pages 5–34 to 5–35 of Perry's Chemical Engineering Handbook (50th Edition), is defined for the present purposes as a length of straight pipe of a given diameter which produces under identical flow conditions the same pressure drop as actually observed.

Figure 2B:
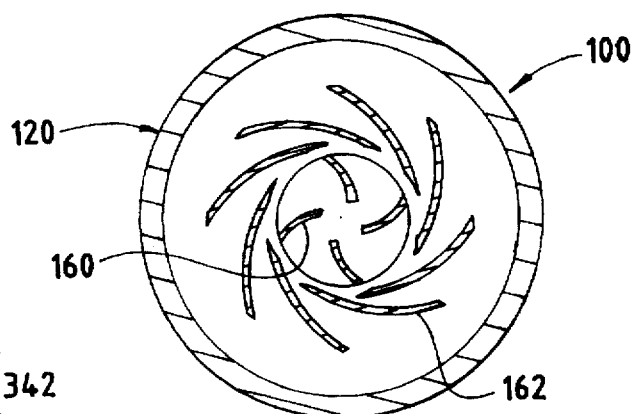
FIG. 2b is a cross sectional plan view of the hydrotreating reactor shown in FIG. 1 taken along line B—B of FIG. 1 depicting a recycle pump and a recycle distributor.

The fluid jets transfer momentum which tends to rotate the fluid in the plenum, thereby creating a swirl velocity. The feed fluid is joined by recycle fluid from the recycle pump 160. FIG. 2b, which is a cross sectional plan view taken along line B—B of FIG. 1, depicts rotatable impeller vanes of recycle pump 160. Preferably, recycle fluid exiting the recycle pump 160 encounters a stationary recycle distributor 162, also depicted in FIG. 2, having vanes which turn the recycle fluid so as to impart a swirling motion which reinforces the swirl velocity of the feed fluid.

The feed fluid blends with the recycle fluid and travels upwardly to meet the grid 130. A relatively buoyant phase, in this case hydrogen rich gas, accumulates below the grid 130 forming a phase boundary within the plenum. The elevation of the phase boundary in the vicinity of a particular riser 138 largely determines the proportion of phases which flow through that riser. Referring again to FIG. 8 it should be apparent that a denser phase, such as hydrocarbon liquid, is prevented from entering the inlet apertures 838 at any point above the phase boundary. Similarly, the relatively buoyant phase must enter the inlet apertures at an elevation above the phase boundary. Annularly uniform fluid flow through the grid 130 into the reaction space 133 is favored when the elevation of the phase boundary beneath the grid 130 is annularly uniform.

Rotation of the fluid in the plenum 132 tends to create a phase boundary that is annularly uniform. Such a phase boundary interface tends to produce an annularly uniform flow distribution in the reaction space 133. Fortunately, the effect of the swirl velocity on the interface shape can be estimated by assuming that the rotation creates a vortex at the free surface causing the liquid interface to be lifted up at the sidewall 122. The shape of the interface can be obtained by solving well-known momentum equations. However, this mathematical prediction should only be viewed as an estimate as the parabolic profile predicted may not be fully realized under actual two phase flow conditions.

The shape of the phase boundary in the plenum can be used to control the velocity distribution of gas and liquid in the reaction space and, thereby, to control the magnitude of circulation and fluid shear in the reaction space. For example, at higher swirling velocities in the plenum, the phase boundary assumes a deeper concave vortex shape which results in a higher circulation in the reaction space with a higher fluid shear. Generally, the deeper vortex shape permits relatively more gas to flow upwardly in the central region of the grid and produces a circulation which ascends in the central portion of the reaction space and descends near the vessel wall.

Preferably, the ports 142 are adapted to deliver the feed fluid at a velocity having a horizontal velocity component which is about 1 to about 10 times the rise velocity of the buoyant phase at operating conditions. More preferably, the axial flow produced by the rotating of the fluid in the plenum 132 imparts a substantially axially symmetric mixing motion to the fluid in the reaction space 133.

Figure 3:
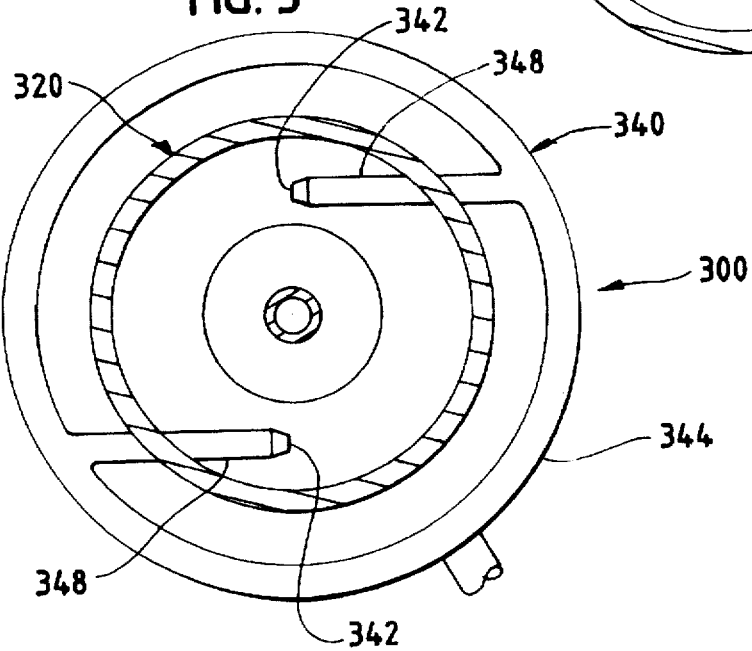
FIG. 3 is a cross sectional plan view of a resid hydrotreating reactor which includes an external header and a feed distributor defining two ports.

Referring now to FIG. 3, the invention may be practiced in an apparatus, such as the apparatus 300, which includes a reactor vessel 320, an external feed header 344, two feed conduits 348, and two ports 342, each served by one of the conduits 348. For clarity, elements depicted in FIG. 3 which are analogous to elements depicted in FIG. 1 are assigned element numbers which end in the same digits as the related elements in FIG. 1. For example, reactor vessel 320 in FIG. 3 is analogous to reactor vessel 120 in FIG. 1.

Figure 4:
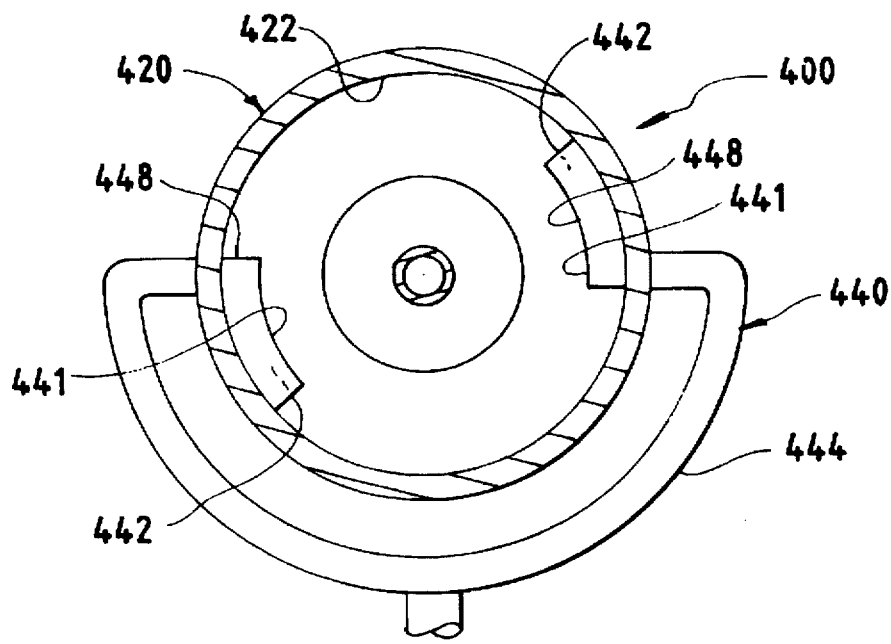
FIG. 4 is a cross sectional plan view of a resid hydrotreating reactor showing an external header and a feed distributor wherein baffles and a sidewall of a reactor vessel define two ports.

Apparatus 400, depicted in FIG. 4, is also within the scope of the instant invention. FIG. 4 illustrates feed conduits 448 which are defined by baffles or ducts 441 and the sidewall 422 of reactor vessel 420. Ports 442 are similarly defined by the cooperation of baffles 441 and the sidewall 422. The feed conduits 448 and the external header 444 constitute a feed distributor 440.

Figure 5:
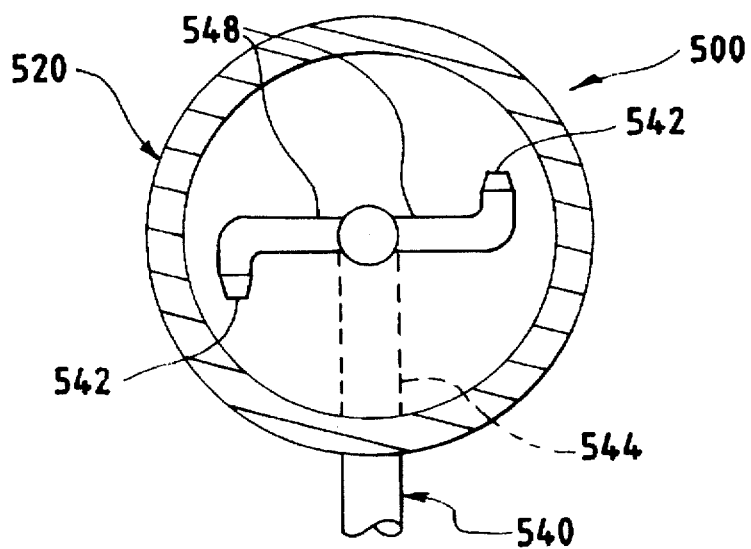
FIG. 5 is a cross sectional plan view of a hydrotreating reactor having an internal header and a feed distributor which defines two ports.

FIG. 5 depicts another variation of the instant invention. Apparatus 500 includes reactor vessel 520 and a feed distributor 540. Included in the feed distributor 540 are an internal header 544, two feed conduits 548, and two ports 542.

Figure 6:
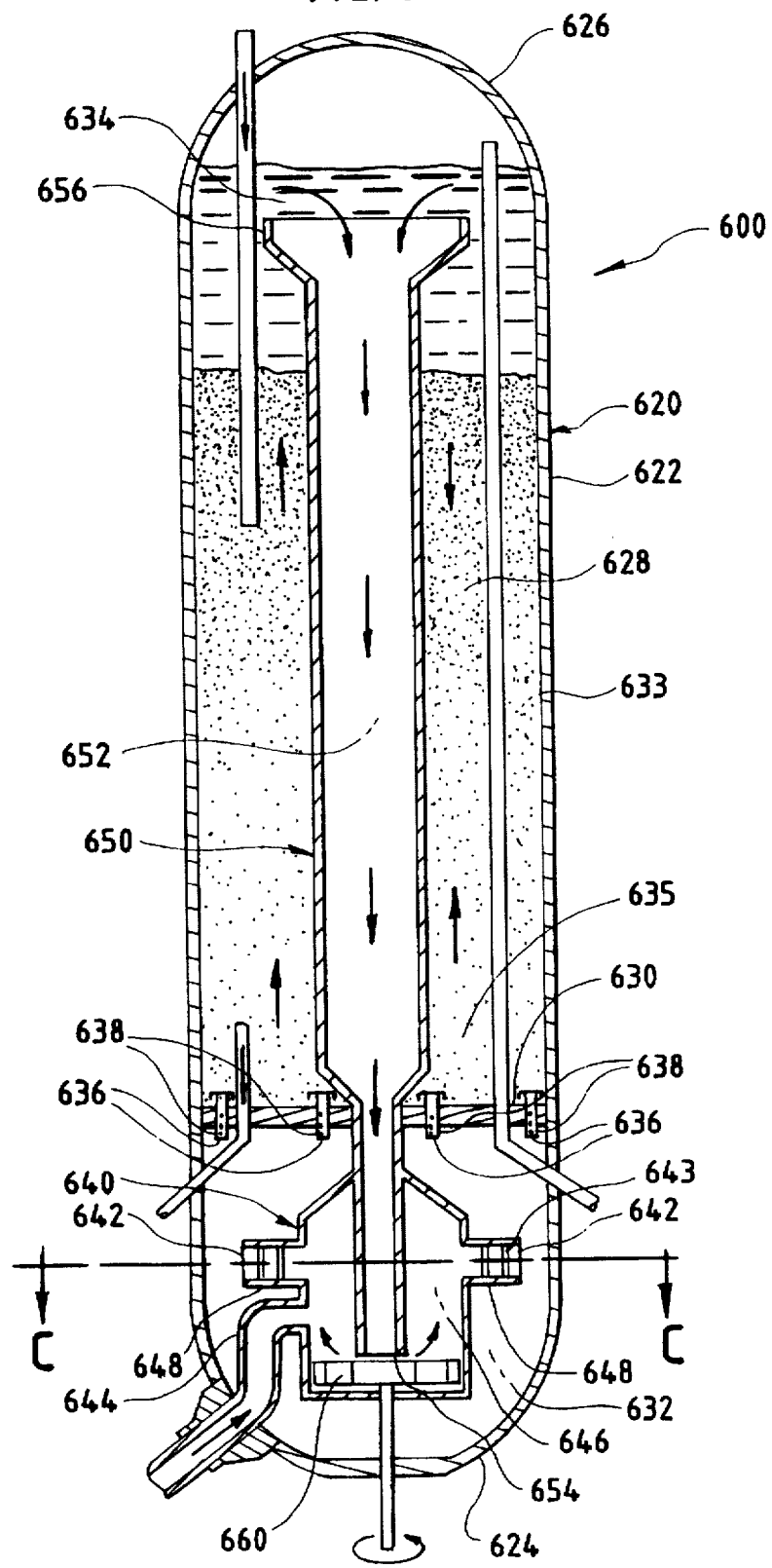
FIG. 6 is a cross sectional elevation view of a resid hydrotreating reactor in accordance with the present invention including a feed distributor suitable for blending a feed fluid and a recycle fluid to produce a combined fluid.

Another aspect of the invention is presented in FIG. 6. Elements in FIG. 6 which are analogous to elements shown in FIG. 1 are assigned element numbers having the same last two digits as the related elements in FIG. 1. Apparatus 600 differs from apparatus 100, which was described above, in that the feed distributor 640 is suitable for delivering a fluid feed and for blending the feed fluid and a recycle fluid to produce a combined fluid. Preferably, the feed fluid header 644 defines a flow chamber 646 which is disposed annularly about the recycle conduit 150. It is especially preferred that the flow chamber 646 communicates hydraulically with a discharge of the recycle pump 660 so that the feed fluid and the recycle fluid are mingled and passed together to the feed fluid distributor 640, as depicted in FIG. 6.

Figure 7:
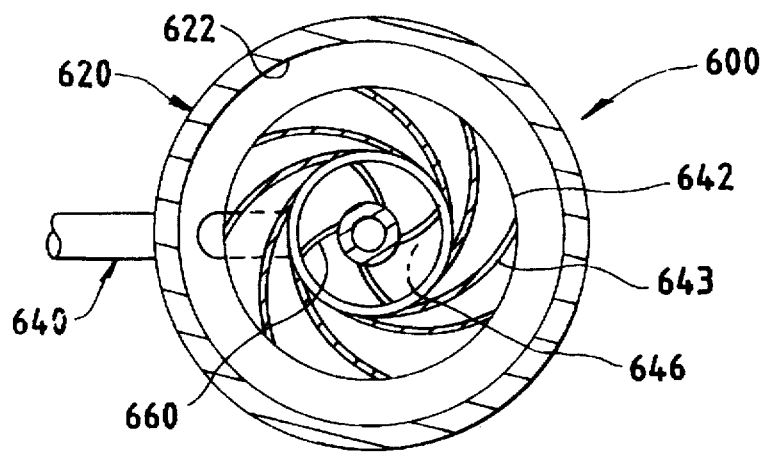
FIG. 7 is a cross sectional plan view of the resid hydrotreating reactor shown in FIG. 6 taken along line C—C of FIG. 6.

FIG. 7 shows a cross sectional plan view taken along line C—C of FIG. 6. FIG. 7 depicts the manner in which feed distributor 640 penetrates the sidewall 622 of the reactor vessel 620 to deliver feed fluid to annularly disposed flow chamber 646. Rotatable impeller vanes of the recycle pump 660 and stationary turning veins, which define port 642, can also be seen in FIG. 7. Returning now to FIG. 6, the feed distributor 640 comprises turning vanes and a housing which define ports 642. Each of the ports 642 is located a radially distance from the axis of the plenum, oriented to deliver the feed fluid in a common plane which is transverse to the axis, and facing a shared rotary direction relative to the axis. The flow chamber 646 communicates hydraulically with each of the ports 642 by feed fluid conduits 648. The ports 642 are spaced about the axis. Preferably, each of the feed fluid conduits 648 is of hydraulically equivalent length.

In still another preferred aspect, the invention is a process for conducting a chemical process. Although the process is not limited to a particular type of apparatus, the process will be described with reference to FIG. 1 for clarity. During operation, a feed fluid including a relatively buoyant phase and a denser phase is passed into plenum 132. Feed fluid emerging from ports 142 defined by feed distributor 140 forms jets which create a turning moment to rotate fluid in the plenum 132. Rotating the feed fluid in the plenum 132 about the axis tends to promote an annularly symmetric flow of the fluid. Optionally, recycle fluid may be blended with the feed fluid in the plenum 132.

The feed fluid and, optionally, the recycle fluid pass axially from the plenum 132 through passages 136 defined by the grid 130 to a reaction space 133. Solid particles of a catalyst for converting the feed fluid to a chemical reaction product are present in the reaction space 133, preferably as an ebullated bed. The feed fluid is exposed to the catalyst and a reaction product is withdrawn from the reaction space 133. Preferably, the rotating of the fluid includes delivering the feed fluid through the ports 142 at a velocity having a horizontal velocity component which is about 1 to about 10 times the rise velocity of the buoyant phase at operating conditions.

In yet another preferred aspect, the invention is a hydrotreating process which is now described with reference to FIG. 6, although the hydrotreating process is not limited to any specific apparatus. In the hydrotreating process a feed fluid including a hydrocarbon liquid and a hydrogen rich gas is passed through a feed distributor 640 into a plenum 632. In the plenum 632, the feed fluid is blended with a recycle fluid from a recycle pump 660 to produce a combined fluid. The combined fluid is delivered through a distributor 640 having stationary turning vanes 643 which form conduits 648 and define ports 642. The delivery of the combined fluid through the distributor 640 creates jets which rotate the combined fluid about the axis of the plenum 632.

The combined fluid is passed axially from the plenum 632 through passages 632 defined by the grid 630. The passages 636 communicate with the plenum 632 and the reaction space 633. The combined fluid is received into the reaction space 633 in a substantially annularly symmetric flow and exposed to a catalyst to produce a hydrotreated product. The product is withdrawn from the reaction space 633 and a portion of the product is conveyed to the plenum 632 to constitute the recycle fluid.

It is contemplated that the instant invention be practiced in a reactor having a grid without risers, or with risers that do not extend substantially below the elevation of the grid. In both cases, there is relatively little tendency for buoyant phases to concentrate beneath such grids. However, experiments have demonstrated that such reactor vessels are unfavorably effected by non-uniform annular flow; therefore, the advantages of the instant invention can be realized in reactor vessels having such grids.

Under some operating conditions, relatively large bubbles or droplets of buoyant phases which can interfere with the promotion of annular flow separate from fluids exiting ports, such as the ports 138 and 638. However, the problem of large bubbles causing localized interference can be significantly minimized by installing a static mixer in the feed line to more intimately mix the phases in the feed fluid. Also, the addition of an eccentric reducer to the ports provides considerable mixing of phases and minimizes interference from large bubbles.

We claim as our invention:

1. A process for conducting a chemical reaction, which comprises:

passing a feed fluid which includes a relatively buoyant phase and a denser phase into a plenum having an axis, the plenum defined by a side wall and an inlet end of a vertically oriented reactor vessel and by a foraminous grid extending transversely from the side wall;

rotating the feed fluid in the plenum about the axis to promote an annularly symmetric flow of the fluid by delivering the feed fluid through a feed distributor defining within the plenum two or more ports, each of the ports located a radial distance from the axis, oriented to deliver the feed fluid in a common plane which is transverse to the axis, and facing a shared rotary direction relative to the axis;

passing the feed fluid axially from the plenum through passages defined by the grid to a reaction space, the reaction space defined by the grid and by the side wall and an outlet end of the reactor vessel which is relatively higher as compared to the inlet end;

exposing the feed fluid in the reaction space to a catalyst composed of solid particles in an ebullated bed for converting the feed fluid to a chemical reaction product; and withdrawing the product from the reaction space.

2. The process of claim 1 wherein the ports are spaced about the axis, each of the ports communicates hydraulically with a feed fluid header via a feed fluid conduit, and each of the feed fluid conduits are of equal hydraulic length.

3. The process of claim 1 wherein the ports are adapted to deliver the feed fluid at a velocity having a horizontal velocity component which is about one to about ten times the rise velocity of the buoyant phase at operating conditions.

4. The process of claim 1 wherein the feed fluid and a recycle fluid withdrawn from the reaction space are passed simultaneously through the feed distributor.

5. The process of claim 1 wherein each of the passages defined by the grid communicates with the plenum through a riser, and a material rich in the buoyant phase is concentrated beneath the grid to form a phase boundary within the plenum.

6. The process of claim 1 wherein the axial flow produced by the rotating of the fluid in the plenum imparts a substantially annularly symmetric mixing motion to the fluid in the reaction space.

7. A hydrotreating process, which comprises:

passing a feed fluid including a hydrocarbon liquid and a hydrogen-rich gas into a plenum having an axis, the plenum being defined by a side wall and an inlet end of a vertically oriented reactor vessel and by a foraminous distribution grid extending transversely from the side wall;

blending the feed fluid and a recycle fluid to produce a combined fluid;

rotating the combined fluid about the axis of the plenum by delivering the fluid through a feed distributor defining within the plenum two or more ports, each of the ports located a radial distance from the axis, oriented to deliver the feed fluid in a common plane which is transverse to the axis, and facing a shared rotary direction relative to the axis;

passing the combined fluid axially from the plenum through passages defined by the grid, the passages communicating with the plenum and a reaction space, the reaction space defined by the grid and by the side wall and an outlet end of the reactor vessel;

receiving the combined fluid into the reaction space in a substantially annularly symmetric flow, and exposing the combined fluid to a catalyst composed of solid particles in an ebullated bed to produce a hydrotreated product;

withdrawing the hydrotreated product from the reaction space; and conveying through a recycle conduit defining a bore and having a proximate end which communicates with the plenum and a distal end which communicates with a distal portion of the reaction space located an axial distance from the grid a portion of the hydrotreated product to the plenum to constitute the recycle fluid.

8. The process of claim 7 wherein a feed fluid header defines a flow chamber which communicates hydraulically with each of the ports via feed fluid conduits, the ports are spaced about the axis, and each of the feed fluid conduits are of equal hydraulic length.

9. The process of claim 8 wherein the feed fluid header includes a flow chamber annularly disposed about the recycle conduit.

10. The process of claim 7 wherein the rotating of the combined fluid includes delivering the recycle fluid through a recycle distributor defining two or more ports, each of the ports located a radial distance from the axis, oriented to deliver the feed fluid in a common plane which is transverse to the axis, and facing a shared rotary direction relative to the axis.

11. The process of claim 7 wherein the feed fluid and the recycle fluid are passed to a combined fluid distributor defining two or more ports, each of the ports located a radial distance from the axis, oriented to deliver the combined fluid in a common plane which is transverse to the axis, and facing a shared rotary direction relative to the axis.

12. The process of claim 7 wherein the reactor vessel is vertically disposed with the inlet end relatively lower than the outlet end, a preponderance of the passages defined by the grid communicate with the plenum through risers, the combined fluid includes a mixture of the hydrocarbon liquid and the hydrogen-rich gas, and a material rich in the hydrogen-rich gas is concentrated beneath the grid forming a phase boundary within the plenum.

13. The process of claim 12 wherein each of the risers defines an inlet aperture suitable for receiving the combined fluid and the material rich in the hydrogen-rich gas in proportions which vary as a function of the elevation of the phase boundary relative to the elevation of the slot.

14. The process of claim 7 wherein the annularly symmetric flow produced by the rotating of the combined fluid in the plenum imparts a substantially annularly symmetric mixing motion to the combined fluid in the reaction space.

* * * * *